UNITED STATES PATENT OFFICE.

MAX BECKE, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

YELLOW AND ORANGE PIGMENT COLORS.

No. 844,845.  Specification of Letters Patent.  Patented Feb. 19, 1907.

Application filed January 14, 1905. Serial No. 241,110.

*To all whom it may concern:*

Be it known that I, MAX BECKE, chemist, a citizen of the Empire of Austria, and residing at Höchst-on-the-Main, Germany, have invented certain new and useful Improvements in the Manufacture of Yellow and Orange Pigment Colors, of which the following is a specification.

The importance of chrome-yellow among pigment colors is due to its beautiful shade and great fastness. It is, however, rather poisonous and sensitive toward hydrogen sulfid—drawbacks greatly felt in its manufacture and use. The same applies to chrome-orange.

Attempts have been made to substitute for chrome-yellow non-poisonous pigment colors made from artificial dyestuffs, but without success, whenever, besides the beautiful tint, the fastness to water, alkali, lime, and light come into consideration.

By the present invention non-poisonous pigment colors, which may be used as substitutes for chrome-yellow and chrome-orange as regards tint and properties, are produced by precipitating on white substrata azo dyestuffs obtained by the interaction of diazotized unsulfonated bases like anilin, naphthylamin, their homologues and derivatives with pyrazolones.

For example, a paste of finely-divided insoluble dyestuff or dyestuffs may be suspended in water with the substratum to be dyed in a vessel provided with an agitator and precipitated, for instance, with barium chlorid. Instead of precipitating on an already-existing substratum the latter may be produced simultaneously, or both methods may be combined, or an insoluble azo dyestuff, as paste or powder, may be ground together with the substratum by a suitable mill, edge-runner, or similar appliance.

The manufacture of a yellow azo dyestuff may be combined with that of a pigment color by coupling diazotized base—for instance, anilin, its homologues or derivatives—in presence of a substratum or with simultaneous formation of the latter with a pyrazolone. The pigment colors thus obtained are lakes of yellow to yellow-orange color, very fast to light and to water, lime, and alkali. They may be substituted with advantage for chrome-yellow and chrome-orange in their various applications, and thus are of great importance in the pigment-dye industry. Particularly good results may be obtained, for instance, with azo dyestuffs from anilin, dichloroanilin, ortho-toluidin, meta-toluidin, para-toluidin, meta-xylidin, commercial xylidin, waste xylidin, ortho-anisidin, mesidin, alpha- and beta-naphthylamin, on the one hand, and 1-phenyl-3-methyl-5-pyrazolone, (Knorr, *Annalen*, 238, 156,) 1-para-tolyl-3-methyl-5-pyrazolone, (Knorr, *Berichte*, XVII, 558,) 1-para-ethoxyphenyl-3-methyl-5-pyrazolone, (Stolz, *Ber.*, XXV, 1663; .Altschul, *Berichte*, XXV, 1852,) 1:3-diphenyl-5-pyrazolone, German Patent No. 42,726,) and 3-phenyl-5-pyrazolone (von Rothenburg, *Berichte*, XXVII, 783) on the other hand. None of these insoluble dyestuffs were hitherto practically used, though several have been described in literature. Compare, for instance, Knorr, *Annalen*, 238, 156, 183, the reaction product of diazobenzene on 1-phenyl-3-methyl-5-pyrazolone; further, von Rothenburg, *Berichte*, XXVII, 782, the action of diazo salts on pyrazolones, especially on such as contain a free $CH_2$ group. At the same place are mentioned the azo derivatives of 1-3-diphenyl-5-pyrazolone and of 3-phenyl-5-pyrazolone, also the ortho-toluidin, para-toluidin, alpha-naphthylamin, and beta-naphthylamin derivatives of these pyrazolones. Nothing is said in literature about the azo derivatives of 1-para-tolyl-3-methyl-5-pyrazolone and 1-para-ethoxyphenyl-3-methyl-5-pyrazolone. These were first produced by me in the usual manner for obtaining azo dyestuffs. In German Patent No. 150,125 is described the manufacture of an azo dyestuff from diazotized ortho-amido-para-sulfo-benzoic acid and 1-phenyl-3-methyl-5-pyrazolone and its importance in the manufacture of yellow lake colors. Compared with these yellow lake colors those obtained by this process are distinguished by their absolute insolubility in water, considerably greater fastness to alkali, and better fastness to light.

The mode of operation is, for instance, as follows:

Example I: Fifty kilograms of Glauber's salt dissolved in five hundred liters of water with two hundred and fifty kilograms of dyestuff-paste and alpha-naphthylamin and phenylmethylpyrazolone are mixed with about two thousand liters of water in a vessel provided with an agitator and then precipitated, while stirring, with a solution of one hundred kilograms of barium chlorid in five hundred liters of water.

Example II: Fifty kilograms of sulfate of alumina dissolved in five hundred liters of water are precipitated with the solution of twenty-five kilograms of Solvay soda in two hundred and fifty liters of water in a vessel with agitator, then mixed with one hundred kilograms of dyestuff-paste from metaxylidin and methylphenylpyrazolone and finally precipitated, while stirring, with the solution of sixty kilograms of barium chlorid in six hundred liters of water.

Example III: Ten kilograms of a dyestuff from anilin and phenylmethylpyrazolone are made into a paste in a suitable mill with one hundred kilograms of heavy spar and some water and mixed by grinding for several hours.

Example IV: Two hundred kilograms of lithopone levigated with water and mixed in a vessel with an agitator with the solution of eighteen kilograms of phenylmethylpyrazolone, twelve kilograms of soda-lye of 40° Baumé specific gravity, fifteen kilograms of Solvay soda in about four hundred liters of water, a diazo solution being run in consisting of 10.7 kilograms of ortho-toluidin, thirty-five kilograms of hydrochloric acid of 20° Baumé specific gravity dissolved in two hundred liters of water and cooled down to 0° centigrade, are diazotized at this temperature with the solution of seven kilograms of nitrite.

Having now described my process, what I claim is—

As new products, non-poisonous yellow to orange lakes, containing an inorganic substratum and an insoluble azo dyestuff, obtained by coupling a monoamidoalphyl base free from sulfo and carboxylic groups, with pyrazolones, being very fast to light, insoluble in cold and boiling water, insoluble in alkaline solutions, partly soluble with a yellow to orange color in benzene, toluene, fatty oils and ligroin.

In testimony that I claim the foregoing as my invention I have signed my name in presence of two subscribing witnesses.

MAX BECKE.

Witnesses:
    JOHANN HARTENSTEIN,
    JOSEPH FLACH.